(12) United States Patent
Yu et al.

(10) Patent No.: US 11,770,312 B2
(45) Date of Patent: Sep. 26, 2023

(54) SERVICE DETECTION METHOD AND APPARATUS, DEVICE, AND STORAGE MEDIUM

(71) Applicant: ZTE CORPORATION, Shenzhen (CN)

(72) Inventors: Jinghai Yu, Shenzhen (CN); Xinhua Zhu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/784,811

(22) PCT Filed: Dec. 15, 2020

(86) PCT No.: PCT/CN2020/136454
§ 371 (c)(1),
(2) Date: Jun. 13, 2022

(87) PCT Pub. No.: WO2021/121216
PCT Pub. Date: Jun. 24, 2021

(65) Prior Publication Data
US 2023/0023154 A1    Jan. 26, 2023

(30) Foreign Application Priority Data
Dec. 17, 2019    (CN) .......................... 201911305141.3

(51) Int. Cl.
*H04L 43/026* (2022.01)
*H04L 43/04* (2022.01)
(Continued)

(52) U.S. Cl.
CPC ............ *H04L 43/026* (2013.01); *H04L 43/04* (2013.01); *H04L 43/067* (2013.01); *H04L 43/087* (2013.01); *H04L 63/0236* (2013.01)

(58) Field of Classification Search
CPC ............... H04L 43/026; H04L 47/2441; H04L 41/0893; H04L 47/20; H04L 47/2408;
(Continued)

(56) References Cited

U.S. PATENT DOCUMENTS 10,826,920 B1 * 11/2020 Lin ..................... H04L 63/0236
2014/0006226 A1    1/2014 Katsube
(Continued)

FOREIGN PATENT DOCUMENTS

CN    101827092 A    9/2010
CN    107995014 A    5/2018
(Continued)

OTHER PUBLICATIONS

CN101827092A Apr. 6, 2016.*
(Continued)

*Primary Examiner* — Kyung H Shin
(74) *Attorney, Agent, or Firm* — Vivacqua Crane, PLLC (57) ABSTRACT

Disclosed are a service detection method and apparatus, a device, and a non-transitory computer-readable storage medium. The service detection method may includes: determining a service time interval between service data; determining a matching result of the service time interval according to a set period value and a set jitter value in a preset periodicity judgment parameter; and determining that the service data is periodic service data in response to determining that the matching result of the current service time interval meets a periodicity condition according to a minimum number of matching time intervals and a maximum number of matching time intervals in the periodicity judgment parameter.

8 Claims, 7 Drawing Sheets

(51) Int. Cl.
*H04L 43/067* (2022.01)
*H04L 43/087* (2022.01)
*H04L 9/40* (2022.01)

(58) Field of Classification Search
CPC ............. H04L 47/2483; H04L 43/0882; H04L 63/0236; H04L 43/16; H04L 69/22; H04L 43/04; H04L 67/02; H04L 63/1441; H04L 63/1416
See application file for complete search history.

(56) References Cited

U.S. PATENT DOCUMENTS

2015/0029892 A1   1/2015  Cha
2015/0281025 A1  10/2015  Wallbaum et al.
2018/0367432 A1* 12/2018  Cociglio ............... H04L 43/026

FOREIGN PATENT DOCUMENTS

CN   108632224 A   10/2018
CN   109918272 A    6/2019

OTHER PUBLICATIONS

International Searching Authority. International Search Report and Written Opinion for PCT Application No. PCT/CN2020/136454 and English translation, dated Mar. 22, 2021, pp. 1-9.
Li, et al. "Prediction Method of Cyclic Time Series Based on DTW Similarity," Computer Science, 2019, vol. 46, No. 5, pp. 157-162.
European Patent Office. Extended European Search Report for EP Application No. 20901752.4, dated Jan. 4, 2023, pp. 1-9.

* cited by examiner

| Tc1 | Tc2 | Tc3 | Tc4 | Tc5 | Tc6 | Tc7 | Tc8 | Tc9 | Tc10 |
|---|---|---|---|---|---|---|---|---|---|
| 5.01 | 2.01 | 2.98 | 5.02 | 4.98 | 5.01 | 5 | 5.05 | 5.03 | 5.05 |

| Tc11 | Tc12 | Tc13 | Tc14 | Tc15 | Tc16 | Tc17 | Tc18 | Tc19 | Tc20 |
|---|---|---|---|---|---|---|---|---|---|
| 5.01 | 5.01 | 4.98 | 5.02 | 4.98 | 5.01 | 5 | 5.04 | 5.03 | 5.05 |

| Tc21 | Tc22 | Tc23 | Tc24 | Tc25 | Tc26 | Tc27 | Tc28 | Tc29 |
|---|---|---|---|---|---|---|---|---|
| 5.01 | 5.01 | 4.99 | 5.02 | 4.98 | 5.01 | 5 | 5.05 | 5.03 |

Fig. 8

| Tc1 | Tc2 | Tc3 | Tc4 | Tc5 | Tc6 | Tc7 | Tc8 | Tc9 | Tc10 |
|---|---|---|---|---|---|---|---|---|---|
| 5.01 | 2.01 | 2.98 | 5.02 | 4.98 | 5.01 | 3 | 5.05 | 5.03 | 5.05 |

| Tc11 | Tc12 | Tc13 | Tc14 | Tc15 | Tc16 | Tc17 | Tc18 | Tc19 | Tc20 |
|---|---|---|---|---|---|---|---|---|---|
| 5.01 | 3.8 | 4.98 | 5.02 | 4.98 | 10 | 5 | 5.04 | 5.03 | 5.05 |

| Tc21 | Tc22 | Tc23 | Tc24 | Tc25 | Tc26 | Tc27 | Tc28 | Tc29 |
|---|---|---|---|---|---|---|---|---|
| 1 | 5.01 | 4.99 | 5.02 | 6.4 | 5.01 | 5 | 5.05 | 5.03 |

SERVICE DETECTION METHOD AND APPARATUS, DEVICE, AND STORAGE MEDIUM

CROSS-REFERENCE TO RELATED APPLICATION

This application is a national stage filing under 35 U.S.C. § 371 of international application number PCT/CN2020/136454, filed Dec. 15, 2020, which claims priority to Chinese patent application No. 201911305141.3, filed Dec. 17, 2019. The contents of these applications are incorporated herein by reference in their entirety.

TECHNICAL FIELD

Embodiments of the present application relates to the field of network communication, and in particular, to a service detection method and apparatus, a device, and a non-transitory computer-readable storage medium.

BACKGROUND

When deploying deterministic service flows, the centralized configuration is widely used at present.

Figure 1:
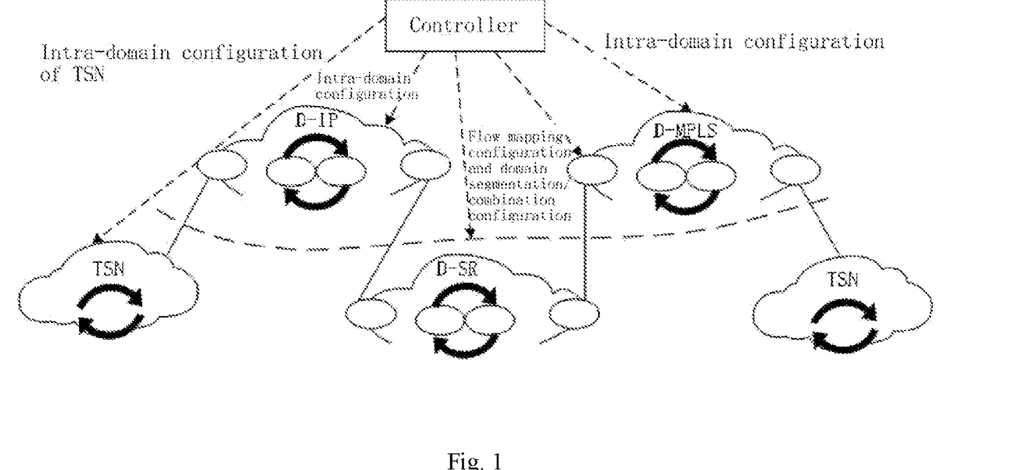
FIG. 1 is a schematic diagram of a centralized configuration in the related technology.

FIG. 1 is a schematic diagram of a centralized configuration in the related technology. As shown in FIG. 1, a centralized controller controls the service configuration of the whole network, including the intra-domain configuration of the time sensitive network (TSN) and the intra-domain configuration of the IP domain (D-IP), the intra-domain configuration of the multi-protocol label switching domain (D-MPLS), the intra-domain configuration of the segment routing domain (D-SR), as well as the flow mapping configuration and the domain segmentation/combination configuration between domains. Regardless of whether the distributed deployment technology or the centralized configuration method is adopted, there are quite a lot of configuration work related to the service flow.

In the actual service deployment scenario, there are a lot of service flows, and errors and omissions are inevitable if the configuration is only done manually. At present, there are some detection methods for service data, such as IP flow information export (IPFIX), network monitoring (NetFlow), deep packet inspection (DPI) and the like. However, these methods are only for sampling and analysis on the service data, but cannot solve the problem of errors and omissions in the above-mentioned service configuration.

SUMMARY

Embodiments of the present application provide a service detection method and apparatus, a device, and a non-transitory computer-readable storage medium.

In accordance with an aspect of the present application, an embodiment provides a service detection method, which includes:
  determining a service time interval between service data;
  determining a matching result of the service time interval according to a set period value and a set jitter value in a preset periodicity judgment parameter; and
  determining that the service data is periodic service data in response to determining that the matching result of the current service time interval meets a periodicity condition according to a minimum number of matching time intervals and a maximum number of matching time intervals in the periodicity judgment parameter.

In accordance with an aspect of the present application, an embodiment further provides a service detection apparatus, which includes:
  an interval determination module, configured to determine a service time interval between service data;
  a matching module, configured to determine a matching result of the service time interval according to a set period value and a set jitter value in a preset periodicity judgment parameter; and
  a periodicity judgment module, configured to determine that the service data is periodic service data in response to determining that the matching result of the current service time interval meets a periodicity condition according to a minimum number of matching time intervals and a maximum number of matching time intervals in the periodicity judgment parameter.

In accordance with an aspect of the present application, an embodiment further provides a device, which includes:
  one or more processors;
  a storage apparatus, configured to store one or more programs;
  the one or more programs, when executed by the one or more processors, cause the one or more processors to carry out the service detection method as described above.

In accordance with an aspect of the present application, an embodiment further provides a non-transitory computer-readable storage medium storing a computer program which, when executed by a processor, cause the processor to carry out the above-mentioned service detection method.

According to the embodiments of the present application, a service time interval between service data is determined; a matching result of the service time interval is determined according to a set period value and a set jitter value in a preset periodicity judgment parameter; and a determination is made that the service data is periodic service data in response to determining that the matching result of the current service time interval meets a periodicity condition according to a minimum number of matching time intervals and a maximum number of matching time intervals in the periodicity judgment parameter.

DETAILED DESCRIPTION

The present application will be further described in detail below in conjunction with the accompanying drawings and embodiments. It is to be understood that the embodiments described herein are only intended to illustrate the present application, but not to limit the present application. In addition, it should be noted that, for the convenience of description, the drawings only show some rather than all of the structures related to the present application.

Figure 2:
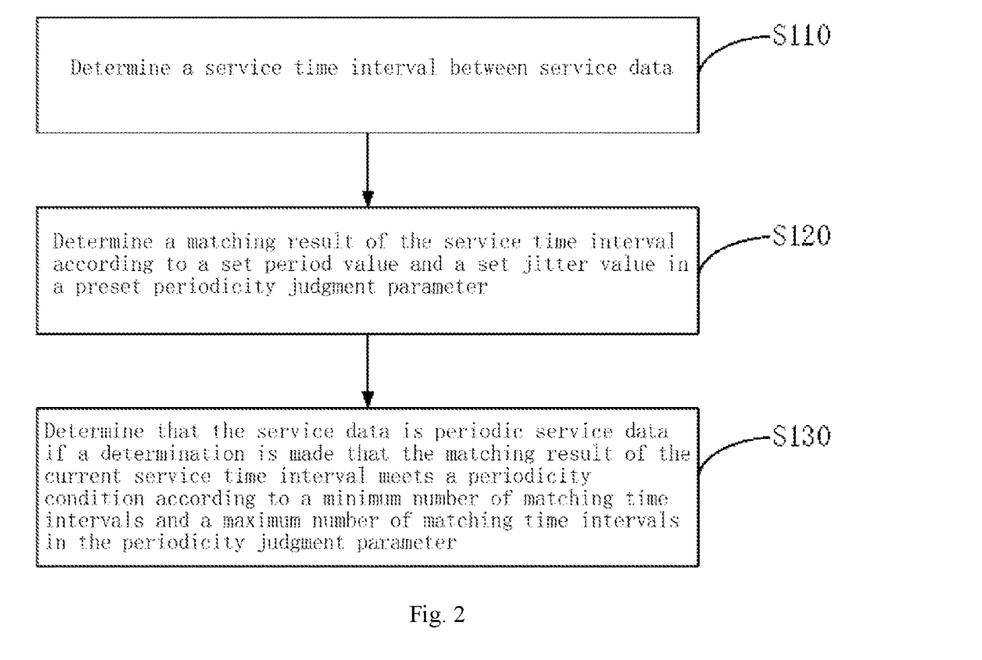
FIG. 2 is a flowchart of a service detection method provided in an embodiment of the present application.

FIG. 2 is a flowchart of a service detection method provided in an embodiment of the present application. This embodiment is applicable to the case of detecting periodic service data. The method may be executed by a service detection apparatus, the apparatus may be implemented in the form of software and/or hardware, and the apparatus may be configured in an electronic device, such as a server, a terminal device, or a network device. Atypical terminal device may be a mobile terminal, such as a mobile phone, a computer, or a tablet computer. As shown in FIG. 2, the method may include steps of S110, S120 S130.

At S110, a service time interval between service data is determined.

The service data may be the data in a service flow transmitted in a network communication system, and the service data may be transmitted in the form of service messages. In this embodiment, the number of service data is not limited, but may be set according to the actual situation. The service time interval may be a time interval between various service data.

In an embodiment, the determining a service time interval between the service data may include: determining the service time interval according to a time stamp of the service data. After acquiring the service data, a difference between the time stamps of adjacent service data may be determined, and the difference is the service time interval. Since the number of service data may be multiple, the number of service time intervals may also be multiple. The service time interval may be determined by the formula Tc(i)=Tstamp(i+1)−Tstamp(i), where Tc(i) may denote the service time interval, Tstamp(i) may denote the time stamp of the $i^{th}$ service data, Tstamp(i+1) may denote the timestamp of the $(i+1)^{th}$ service data, and the service time interval may be recorded as Tc1, Tc2 . . . TcN, respectively, where the specific value of N may be set according to the actual situation.

At S120, a matching result of the service time interval is determined according to a set period value and a set jitter value in a preset periodicity judgment parameter.

The periodicity judgment parameters may be a preset parameter required for performing periodicity judgment on service data, and the periodicity judgment parameters in this embodiment may include a set period value, a set jitter value, a minimum number of matching time intervals, and a maximum number of matching time intervals. The set period value may denote a period value of target detection, and the set jitter value may denote an allowable deviation when judging the time periodicity of service data, which is valid within the range of the set jitter value. The set period value and the set jitter value may be fixed values or estimated values, the fixed value is set by the user, the estimated value is an automatically estimated value, and the set jitter value is less than or equal to the set period value. The minimum number of matching time intervals and the maximum number of matching time intervals are described below.

In an embodiment, the determining a matching result of the service time interval according to the set period value and the set jitter value in the periodicity judgment parameters may include: determining that matching is successful if a difference between the service time interval and the set period value is less than or equal to the set jitter value; otherwise, determining that the matching fails. The absolute value of the difference between each service time interval and the set period value is compared with the set jitter value, if the absolute value of the difference is less than or equal to the set jitter value, a determination is made that the matching is successful, and if the absolute value of the difference is greater than the set jitter value, a determination is made that the matching fails. That is, if the service time interval is between a first target value, which is the difference between the set period value and the set jitter value, and a second target value, which is the sum of the set period value and the set jitter value, a determination is made that the matching is successful.

At S130, the service data is determined as periodic service data if a determination is made that the matching result of the current service time interval meets a periodicity condition according to a minimum number of matching time intervals and a maximum number of matching time intervals in the periodicity judgment parameters.

The maximum number of matching time intervals may indicate the maximum number of service time intervals in succession for which the periodicity detection fails, for judging that the current service data is not periodic service data. The periodicity may also be indicated by the maximum number of periodic services. The maximum number of periodic services indicates the maximum number of service data in succession for which the periodicity detection fails, for judging that the current service data is not periodic service data, and the maximum number of periodic services minus one is the above-mentioned maximum number of matching time intervals. The minimum number of matching time intervals may indicate the minimum number of service time intervals in succession for judging the periodicity, which may be indicated by the minimum number of periodic services. The minimum number of periodic services indicates the minimum number of service data in succession for judging the periodicity, and the minimum number of periodic services minus one is the minimum number of matching time intervals. The minimum number of matching time intervals is less than or equal to the maximum number of matching time intervals.

Figure 3:
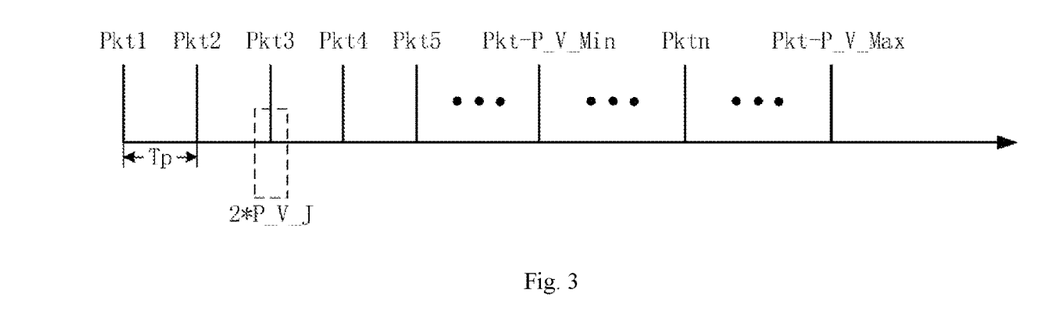
FIG. 3 is a schematic diagram of a relationship between periodicity judgment parameters provided in an embodiment of the present application.

The relationship between the periodicity judgment parameters is shown in FIG. 3. FIG. 3 is a schematic diagram of a relationship between the periodicity judgment parameters provided in an embodiment of the present application. In the figure, Pkti may denote the $i^{th}$ service data, Tp may denote the service time interval between two adjacent service data, the number of service time intervals is the number of service data minus one, P_V_J may denote the set jitter value, the dotted box in the figure may denote the jitter value range, and the jitter value range may be twice the set jitter value, that is, 2*P_V_J_in the figure. P_V_Min may denote the minimum number of matching time intervals, and P_V_Max may denote the maximum number of matching time intervals.

Figure 4:
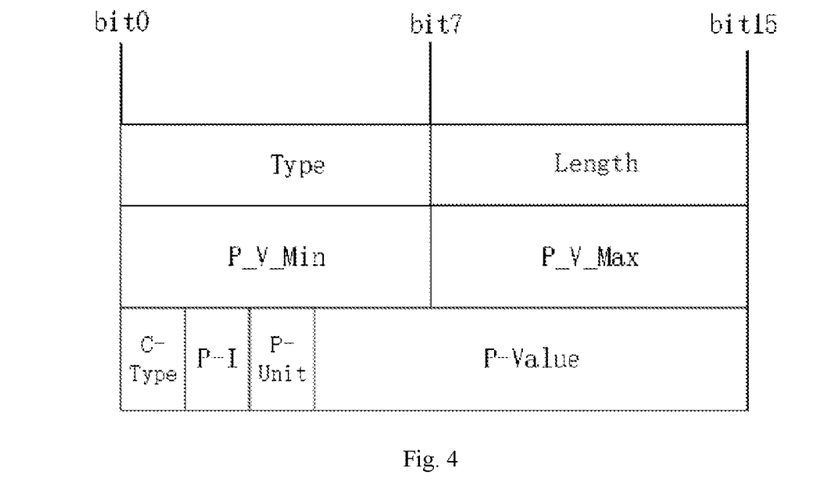
FIG. 4 is a schematic diagram of a format of periodicity judgment parameters provided in an embodiment of the present application.

The parameters in the periodicity judgment parameters may be configured through a command-line interface (CLI)

or through a controller. Exemplarily, the parameter format configured by the controller may be as shown in FIG. 4, which is a schematic diagram of a format of periodicity judgment parameters provided in an embodiment of the present application. In the figure, "Type" indicates that this part of the content is the configuration information of periodicity judgment parameters, "Length" indicates the length of subsequent information, P_V_Min may indicate the minimum number of matching time intervals, and P_V_Max may indicate the maximum number of matching time intervals.

Each configuration information of the set jitter value P_V_J and the set period value Tp may be indicated by 2 bytes, which are divided into four parts, including C-Type, P-I, P-Unit and P-Value in FIG. 4. C-Type indicates whether P_V_J or Tp is configured, which is indicated by 2 bits. When C-Type=00b, it indicates that Tp is configured; when C-Type=01b, it indicates that P_V_J is configured, and 10b and 11b are temporarily reserved. P-I may indicate whether P_V_J or Tp is a fixed value or an estimated value, which is indicated by 1 bit. When P-I=0b, it indicates a fixed value, and when P-I=1b, it indicates an automatically acquired estimated value.

P-Unit may be indicated by 3 bits. When P-I=0b, P-Unit indicates the unit of P-Value. At this time, P-Unit=000b indicates that the unit is nanoseconds (ns); P-Unit=001b indicates that the unit is microseconds (us); Unit=010b indicates that the unit is milliseconds (ms); and P-Unit=100b indicates that the unit is seconds (s). When P-I=1b and C-Type=00b, P-Unit denotes the unit with the smallest Tp, that is to say, when the automatically acquired set period value is not an integer, the integer of the unit specified by P-Unit is taken according to the rounding rule, and the definition of P-Unit is the same as above. At this time, the corresponding P-Value is ignored. When P-I=1b and C-Type=01b, P-Unit denotes the unit with the smallest P_V_J, that is to say, when the acquired set jitter value is not an integer, the integer of the unit specified by P-Unit is taken according to the rounding rule, and the definition of P-Unit is the same as above.

P-Value may be indicated by 10 bits. When P-I=0b and C-Type=01b, P-Unit indicates the unit with the smallest P_V_J, and P-Value=[1,7], that is, the value of P-Value is between 1 and 7. If it is not in this range, it will be treated as 7. The function of P-Value is as follows: when the automatically acquired set jitter value $P\_V\_J < Tp/2^{P\text{-}Value}$ needs to be transformed, the value of P_V_J multiplied by P-Value is compared with Tp/2, and the smaller value is taken as the final set jitter value; when the automatically acquired set jitter value $P\_V\_J > Tp/2^{P\text{-}Value}$, no transformation is needed. The meanings of other P-values are shown in Table 1, which is the meaning table of periodicity judgment parameters.

TABLE 1

Meaning Table of Periodicity Judgment Parameters

| | P-I = 0b (fixed value) | P-I = 1 (estimated value) | C-Type = 00 (set period value Tp) | C-Type = 01b (set jitter value P_V_J) | Meaning of P-Value (the value is assumed to be 0 × 10) |
|---|---|---|---|---|---|
| P-Unit = 000b (ns) | √ | | √ | | Indicating Tp = 16 ns |
| P-Unit = 001b (us) | √ | | √ | | Indicating Tp = 16 us |
| P-Unit = 010b (ms) | √ | | √ | | Indicating Tp = 16 ms |
| P-Unit = 100b (s) | √ | | √ | | Indicating Tp = 16 s |
| P-Unit = 000b (ns) | √ | | | √ | Indicating P_V_J = 16 ns |
| P-Unit = 001b (us) | √ | | | √ | Indicating P_V_J = 16 us |
| P-Unit = 010b (ms) | √ | | | √ | Indicating P_V_J = 16 ms |
| P-Unit = 100b (s) | √ | | | √ | Indicating P_V_J = 16 s |
| P-Unit = 000b (ns) | | √ | √ | | Meaningless, to be ignored |
| P-Unit = 001b (us) | | √ | √ | | Meaningless, to be ignored |
| P-Unit = 010b (ms) | | √ | √ | | Meaningless, to be ignored |
| P-Unit = 100b (s) | | √ | √ | | Meaningless, to be ignored |
| P-Unit = 000b (ns) | | √ | | √ | Used to calculate P_V_J |
| P-Unit = 001b (us) | | √ | | √ | Used to calculate P_V_J |
| P-Unit = 010b (ms) | | √ | | √ | Used to calculate P_V_J |
| P-Unit = 100b (s) | | √ | | √ | Used to calculate P_V_J |

In an embodiment, the determining that the matching result of the current service time interval meets a periodicity condition according to a minimum number of matching time intervals and a maximum number of matching time intervals in the periodicity judgment parameters may include: determining that the matching result of the current service time interval meets the periodicity condition if the number of service time intervals successfully matched in succession for a first time is the minimum number of matching time intervals, and the number of currently matched service time intervals is less than or equal to the maximum number of matching time intervals.

If there are service time intervals with the minimum number of matching time intervals successfully matched in succession, and the number of currently matched service time intervals is less than or equal to the maximum number of matching time intervals, a determination is made that the matching result of the current service time interval meets the periodicity condition, and the unmatched service time intervals will not be matched. For example, if the minimum number of matching time intervals is 5 and the maximum number of matching time intervals is 29, if five service time intervals are successfully matched in succession and the number of currently matched service time intervals is less than or equal to 29, a determination is made that the matching result of the current service time interval meets the periodicity condition.

If the number of currently matched service time intervals is equal to the maximum number of matching time intervals, and the number of service time intervals successfully matched in succession is less than the minimum number of matching time intervals, a determination is made that the matching result of the current service time interval does not meet the periodicity condition, and the service data is aperiodic data. For example, if the minimum number of matching time intervals is 5 and the maximum number of matching time intervals is 29, if the number of currently matched service time intervals is equal to 29, and the number of service time intervals successfully matched in succession is less than five, a determination is made that the matching result of the current service time interval does not meet the periodicity condition.

In this embodiment, after the service time intervals are determined, the number of service time intervals is multiple, and each service time interval may be matched sequentially. If a determination is made that the matching results of several current service time intervals meet the periodicity conditions, it may not to match the remaining unmatched service time intervals. Otherwise, continue to match the remaining unmatched service time intervals until the number of currently matched service time intervals is equal to the maximum number of matching time intervals, and if the number of service time intervals successfully matched in succession is less than the minimum number of matching time intervals, a determination is made that the matching result of the current service time interval does not meet the periodicity condition. That is, for each service time interval, each time the matching result of one service time interval is determined, periodicity judgment is made until a determination is made that the periodicity condition is met or not.

In addition, when the number of service time intervals is less than the maximum number of matching time intervals, all service time intervals are extracted, or when the number of service time intervals is greater than or equal to the maximum number of matching time intervals, the service time intervals with the maximum number of matching time intervals are sequentially extracted. After that, the matching results of all the service time intervals are determined. If there are service time intervals with the minimum number of matching time intervals successfully matched in succession, the matching results of the current service time intervals meet the periodicity conditions; otherwise, the matching results of the current service time intervals do not meet the periodicity conditions. That is to say, for each service time interval, all matching results of service time intervals whose number is less than or equal to the maximum number of matching time intervals are determined first, and then periodicity judgment is made to determine whether the periodicity conditions are met or not.

According to the technical schemes of the embodiments of the present application, a service time interval between service data is determined; a matching result of the service time interval is determined according to a set period value and a set jitter value in a preset periodicity judgment parameter; and a determination is made that the service data is periodic service data if a determination is made that the matching result of the current service time interval meets a periodicity condition according to a minimum number of matching time intervals and a maximum number of matching time intervals in the periodicity judgment parameters. In the embodiment of the present application, a service data detection method is added to the network, which may implement the identification of periodic service data, so as to facilitate the configuration of service features, resources and the like, and error detection for the periodic service data. Compared with the manual configuration in the existing technology, the service data detection mode can achieve the effect of reducing errors and omissions and configuration workload, and accelerate the deployment of deterministic services.

On the basis of the above-mentioned technical schemes, before the determining a service time interval between service data, the method further includes: acquiring the service data according to a preset data extraction rule, where the data extraction rule includes at least one of message length, source MAC address, destination MAC address, virtual local area network, priority, source IP address, destination IP address, port number or application layer protocol, and forms of the message length includes a length range, a discrete form, and a mixed form.

After determining that the service data is periodic service data, the method may further include: reporting the service data for service configuration.

Figure 5:
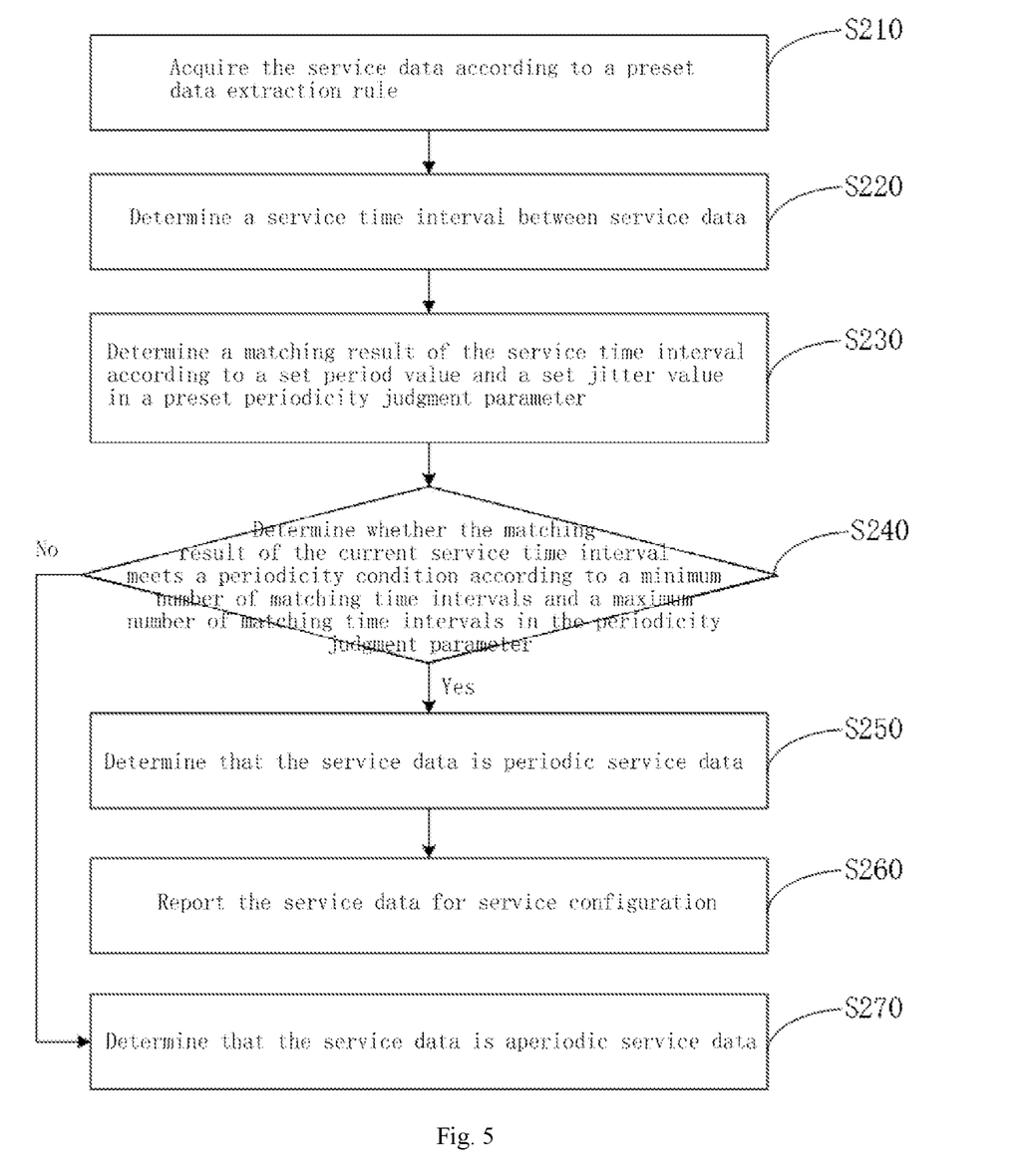
FIG. 5 is a flowchart of another service detection method provided in an embodiment of the present application.

FIG. 5 is a flowchart of another service detection method provided in an embodiment of the present application. This embodiment optimizes the above-mentioned service detection method on the basis of the above-mentioned embodiment. Accordingly, as shown in FIG. 5, the method of this embodiment includes steps of S210, S220, S230, S240, S250, S260 and S270.

At S210, service data is acquired according to a preset data extraction rule.

The data extraction rule may be the basis or rule for extracting service data in the network communication system, and the specific parameters included in the data extraction rule are not limited in this embodiment. The data extraction rule may include at least one of message length, source media access control (MAC) address, destination MAC address, virtual local area network (VLAN), priority, source internet protocol (IP) address, destination IP address, port number or application layer protocol, and forms of the message length includes a length range, a discrete form, and a mixed form.

The message length is an extraction parameter added in this embodiment, and the number of forms of the message length may be three. The length range denotes a certain range of message lengths, for example, PL=[64,128], where PL (Packet-Length) is the message length, indicating that any message length between 64 and 128 may be matched. The discrete form denotes discrete message lengths, such as PL={64, 128, 256}, indicating that only three message lengths of 64, 128 and 256 may be matched; for another example, PL={140}, that is, only a fixed length of 140 may be matched. The mixed form is the combination of the above-mentioned length range and the discrete form, for example, PL={[64,100],128,256}, indicating that the message length is between 64 and 100, and the length of 128 and 256 may be matched.

Since many industrial control period service flows are fixed-length messages, adding the message length avoids matching of some irrelevant service flows, and can form more accurate and efficient data extraction rules.

Figure 6:
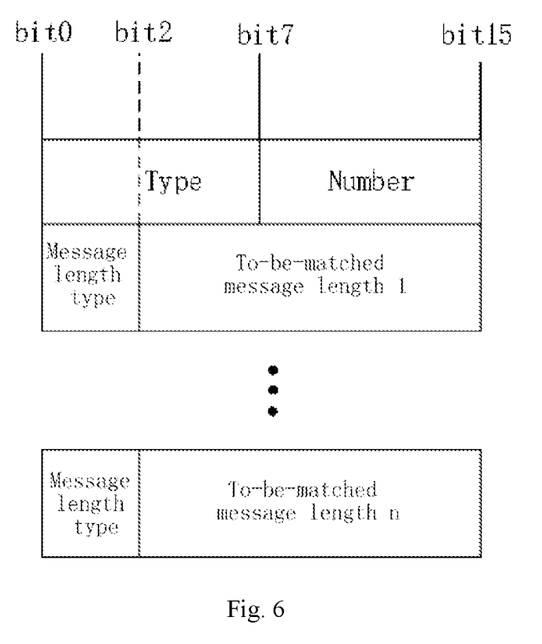
FIG. 6 is a schematic diagram of a message length provided in an embodiment of the present application.

The message length may be configured through the command-line interface (CLI) on the device or through the controller. The message length format configured by the controller may be as shown in FIG. 6, which is a schematic diagram of a message length provided in an embodiment of the present application. In FIG. 6, "Type" indicates that this part of the content is the configuration information of the message length, "Number" indicates how many subsequent to-be-matched message length information, and each subsequent to-be-matched message length information is indicated by 2 bytes, which may be divided into two parts, one of which is indicated by the high 3 bits, indicating the message length type, and the other by the low 13 bits, indicating the message length. The definition of message length type PL-Type is as follows: when PL-Type=0x00, it indicates the starting length of the range; when PL-Type=0x01, it indicates the end length of the range; when PL-Type=0x02, it indicates the discrete length, where PL-Type=0x00 and PL-Type=0x01 appear in pairs, otherwise it is regarded as invalid information.

At S220, a service time interval between service data is determined.

The determining a service time interval between service data may include determining the service time interval according to a time stamp of the service data.

At S230, a matching result of the service time interval is determined according to a set period value and a set jitter value in a preset periodicity judgment parameter.

The periodicity judgment parameters in this embodiment may include a set period value, a set jitter value, a maximum number of matching time intervals, and a minimum number of matching time intervals.

The determining the matching result of the service time interval according to the set period value and the set jitter value in the periodicity judgment parameters may include: determining that matching is successful if a difference between the service time interval and the set period value is less than or equal to the set jitter value; otherwise, determining that the matching fails.

At S240, the matching result of the current service time interval is determined whether meets a periodicity condition according to a minimum number of matching time intervals and a maximum number of matching time intervals in the periodicity judgment parameters.

The determining that the matching result of the current service time interval meets a periodicity condition according to a minimum number of matching time intervals and a maximum number of matching time intervals in the periodicity judgment parameters may include: determining that the matching result of the current service time interval meets the periodicity condition if the number of service time intervals successfully matched in succession for a first time is the minimum number of matching time intervals, and the number of currently matched service time intervals is less than or equal to the maximum number of matching time intervals.

If a determination is made that the matching result of the current service time interval meets the periodicity condition, S250 is executed; if the number of currently matched service time intervals is equal to the maximum number of matching time intervals, and the number of service time intervals successfully matched in succession is less than the minimum number of matching time intervals, a determination is made that the matching result of the current service time interval does not meet the periodicity condition, and then S270 is executed.

At S250, the service data is determined as periodic service data.

At S260, the service data is reported for service configuration.

After determining that the service data is periodic service data, characteristic information such as periodicity value and jitter value of the service data is extracted, and the service data and characteristic information are reported to provide basic support for subsequent centralized configuration, automatic calculation and fault detection. After that, the current periodicity judgment parameters may be deactivated, waiting for subsequent reactivation.

At S270, the service data is determined as aperiodic service data.

When no periodic service data conforming to the current periodicity judgment parameters is detected, the service data is not reported, and the current periodicity judgment parameters may then be deactivated, waiting for subsequent reactivation.

In this embodiment of the present application, according to a preset data extraction rule, service data is acquired, and a service time interval between service data is determined; a matching result of the service time interval is determined according to a set period value and a set jitter value in a preset periodicity judgment parameter; and it is determined whether the matching result of the current service time interval meets a periodicity condition according to a minimum number of matching time intervals and a maximum number of matching time intervals in the periodicity judgment parameters; if yes, a determination is made that the service data is periodic service data, and the service data is reported for service configuration; otherwise, the service data is determined to be aperiodic service data. According to the technical scheme provided in the embodiment of the present application, a service data detection mode is added in the network, which can implement the identification of periodic service data, so as to facilitate the configuration of service features, resources and the like for the periodic service data. Compared with the manual configuration in the existing technology, the service data detection mode can achieve the effects of reducing errors and omissions and configuration workload, and accelerate the deployment of deterministic services. In addition, acquiring service data makes the acquisition of service data more accurate and efficient by increasing the rule of message length.

Figure 7:
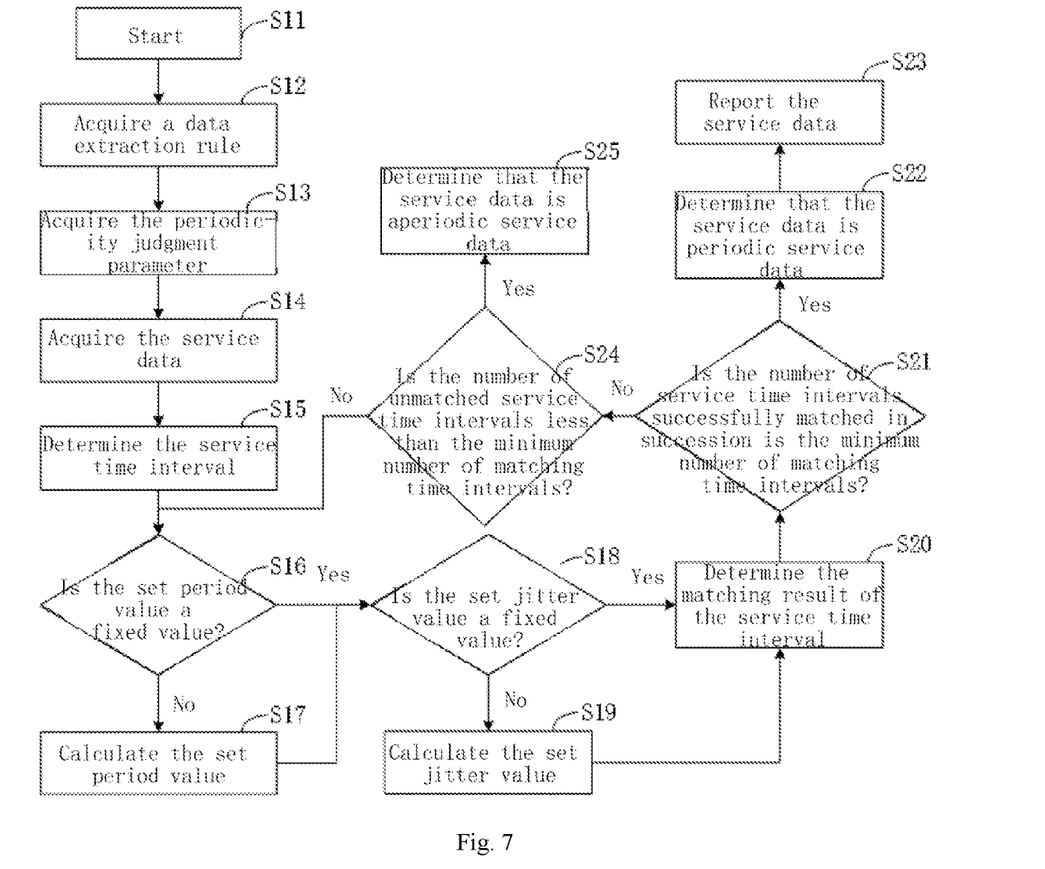
FIG. 7 is a flowchart of still another service detection method provided in an embodiment of the present application.

FIG. 7 is a flowchart of still another service detection method provided in an embodiment of the present application. On the basis of the above-mentioned embodiment, the service detection method provided in the present application is described based on FIG. 7. In this embodiment, the number of service time intervals between service data is set as the maximum number of matching time intervals, and the service detection method may include steps of S11, S12, S13, S14 and S25.

At S11, start.

In the network communication system, the detection function of periodic service data is started based on the user's selection.

At S12, a data extraction rule is acquired.

Message length is added to the data extraction rule, and the forms of message length may include a length range, a discrete form and a mixed form.

At S13, periodicity judgment parameters are acquired.

The periodicity judgment parameters may include a set period value, a set jitter value, a maximum number of matching time intervals and a minimum number of matching time intervals.

At S14, service data are acquired.

According to the preset data extraction rule, the service data of the maximum number of periodic services may be acquired, where the maximum number of periodic services is the maximum number of matching time intervals plus one. If the service data does not have a time stamp, the time stamp may be added according to the sequence of acquiring the service data, so that each service data has a time stamp.

At S15, the service time interval is determined.

A difference between the time stamps of adjacent service data is determined, and the difference is the service time interval. The service time interval may be determined by the formula Tci=Tstamp(i+1)−Tstampi, where Tci may denote the $i^{th}$ service time interval, Tstampi may denote the timestamp of the $i^{th}$ service data, Tstamp(i+1) may denote the timestamp of the $(i+1)^{th}$ service data, and service time intervals may be recorded as Tc1, Tc2 . . . TcN, respectively, where N=P_V_Max, and P_V_Max denotes the maximum number of matching time intervals.

At S16, it is judged whether the set period value is a fixed value.

If the set period value is an estimated value, S17 is executed; if the set period value is a fixed value, S18 is executed.

At S17, the set period value is calculated.

When the set period value is an estimated value, it may be determined based on the following formula:

$$Tp = \sum_{i=Tstart}^{P\_V\_Max} Tci/(P\_V\_Max - Tstart),$$

where Tp denotes the set period value, Tp is converted and rounded according to the unit indicated by the P-Unit, the meaning of P-Unit is shown above, Tci may denote the $i^{th}$ service time interval, P_V_Max denotes the maximum number of matching time intervals, and Tstart denotes the starting value of service time intervals when the period size is automatically calculated, the initial value of Tstart is 1, Tstart=Tstart+1.

After that, S18 is executed.

At S18, it is judged whether the set jitter value is a fixed value.

If the set jitter value is the estimated value, S19 is executed; if the set jitter value is a fixed value, S20 is executed.

At S19, the set jitter value is calculated.

When the set jitter value is an estimated value, it may be determined based on the following formula:

$$P\_V\_J = \sum_{i=Jstart}^{P\_V\_Max} |Tci - Tp|/(P\_V\_Max - Jstart),$$

where P_V_J may denote the set jitter value, and Jstart denotes the starting value of the service time interval when the period size is automatically calculated, the initial value of Jstart is 1, Jstart=Jstart+1. After that, it is determined whether P_V_J needs to be transformed and adjusted. When $P\_V\_J \geq Tp/2^{P\text{-}Value}$, no transformation is needed. When $P\_V\_J < Tp/2^{P\text{-}Value}$, transformation is needed; the value of P_V_J multiplied by P-Value is compared with Tp/2, and the smaller value is taken as the final set jitter value; P_V_J is then converted and rounded according to the unit indicated by P-Unit.

The meaning and value of P-Value are as above, which will not be repeated here.

After that, S20 is executed.

At S20, the matching result of the service time interval is determined.

According to the set period value and the set jitter value, the matching results of each service time interval are determined sequentially. In the process of matching, if a service time interval matching fails, the initial service time interval is moved back by one, and the moved service time interval is taken as the start, and then jump back to S16 to restart the matching.

At S21, it is judged whether the number of service time intervals successfully matched in succession is the minimum number of matching time intervals.

Since the total number of service time intervals is the maximum number of matching time intervals, the number of matched service time intervals may be less than or equal to the maximum number of matching time intervals. If the number of service time intervals successfully matched in succession is the minimum number of matching time intervals, S22 is executed; otherwise, S24 is executed.

At S22, a determination is made that the service data is periodic service data.

After that, S23 is executed.

At S23, the service data is reported.

At S24, it is judged whether the number of unmatched service time intervals is less than the minimum number of matching time intervals.

If the number of unmatched service time intervals is greater than or equal to the minimum number of matching time intervals, the execution returns to S16, and if the number of unmatched service time intervals is less than the minimum number of matching time intervals, S25 is executed.

At S25, a determination is made that the service data is aperiodic service data.

If the number of service time intervals successfully matched in succession is less than the minimum number of matching time intervals, and the number of unmatched service time intervals is less than the minimum number of matching time intervals, the service data can be determined as aperiodic service data without matching the number of unmatched service time intervals.

The above-mentioned service detection method is illustrated by the following three practical examples.

Figure 8:
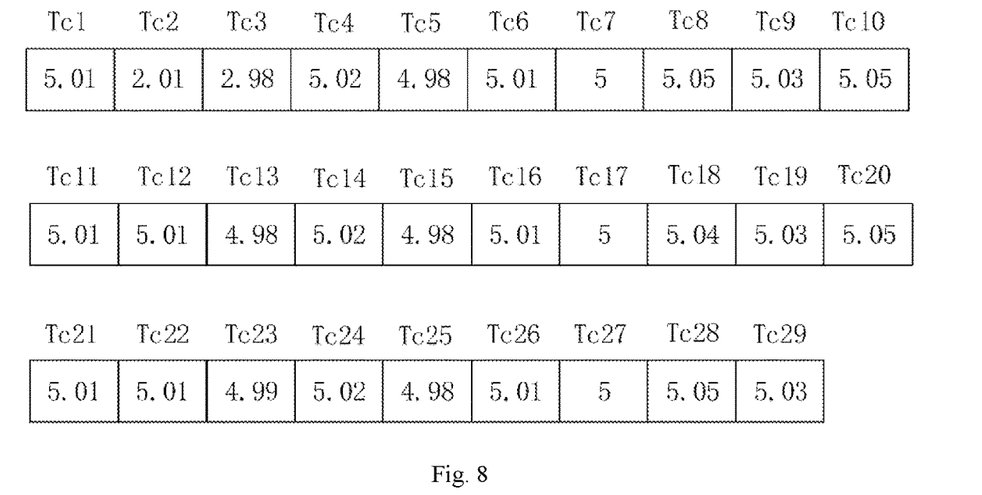
FIG. 8 is a schematic diagram of one service time interval provided in an embodiment of the present application.

In Example one, if the data extraction rule includes destination MAC address (DMAC) and source MAC address (SMAC), and the message length is 80, the set period value in the periodicity judgment parameters Tp=5 ms, the set jitter value P_V_J=100 us, the maximum number of matching time intervals P_V_Max=29, the minimum number of matching time intervals P_V_Min=5, the maximum number of periodic services is 30, and the minimum number of periodic services is 6. 30 pieces of service data are acquired and 29 service time intervals are determined, as shown in FIG. 8, which is a schematic diagram of one service time interval provided in an embodiment of the present application. The unit of the service time interval in FIG. 8 is milliseconds. Since the set period value and the set jitter value are fixed values, Tp=5 ms, and P_V_J=100 us, each service time interval is matched sequentially, and the service time interval is denoted by Tc. When Tc is between 4.9 ms and 5.1 ms, the matching is successful, otherwise, the matching fails. Two parameters, ConCnt and MoveCnt, are set. The initial values of ConCnt and MoveCnt are both 0. ConCnt indicates the number of service time intervals successfully matched, and MoveCnt indicates the number of initial values moved back due to matching failure.

Therefore, Tc1 matching is successful, ConCnt=1, and continue to match Tc2, but Tc2 matching fails, ConCnt=0, MoveCnt=1. Since MoveCnt t<23 or the number of unmatched service time intervals is greater than 5, then continue to judge from Tc2, and Tc2 matching fails, ConCnt=0, MoveCnt=2; judging from Tc3, Tc3 matching fails, ConCnt=0, MoveCnt=3; judging from Tc4, Tc4 matching is successful, ConCnt=1, MoveCnt=3; continue to match Tc5, Tc5 matching is successful, ConCnt=2, MoveCnt=3; similarly, Tc6, Tc7, and Tc8 are all successfully matched, and the number of service time intervals successfully matched in succession for the first time ConCnt=5. The matching result of service time intervals meets the periodicity condition, and the service data is periodic service data. The message feature, the periodicity value and the jitter value are extracted and reported to a management system, and the activation state of the periodicity judgment parameters is terminated, so as not to occupy the processing capacity of a chip.

In Example two, for the service time interval shown in FIG. 8, if the data extraction rule includes DMAC, SMAC and virtual local area network (VLAN), priority, and the message length is 120, the maximum number of matching time intervals in the periodicity judgment parameters P_V_Max=29 and the minimum number of matching time intervals in the periodicity judgment parameters P_V_Min=5. The set period value and the set jitter value are estimated values, P-Unit=010b, indicating that the minimum unit of set period value is ms, P-Unit=001b, indicating that the minimum unit of set value is us, P-Value=6.

The set period value Tp and the set jitter value P_V_J may be calculated. According to the formula in S17, the value of Tc1-Tc29 is accumulated first, and after dividing by 29, Tp=4.84 ms is calculated. After rounding, TP=5 ms. According to the formula in S17, the difference between the value of Tc1-Tc29 and 5 is accumulated first, and after dividing by 29, P_V_J=192.06 us is calculated. After rounding, P_V_J=192 us. After that, because $Tp/2^{P-Value}=5000/2^6=5000/64≈78$ us, 192 us is greater than 78 us, so the finally determined P_V_J=192 us.

When Tc is between 4.808 ms and 5.192 ms, the matching is successful, otherwise, the matching fails. The matching process is as shown in Example one. Tc1 matching is successful, but Tc2 matching fails. Therefore, moving back by one period, and starting from Tc2, Tp and P_V_J are recalculated, the calculation rules are the same as above, and Tp=5 ms, P_V_J=198 us. Continue to match, and Tc2 matching fails. Therefore, continue to move back for one period, starting from Tc3, Tp and P_V_J are recalculated, the calculation rules are the same as above, and Tp=5 ms, P_V_J=95 us. And then continue to match, and Tc3 matching fails. Therefore, continue to move backward for one period, starting from Tc4, Tp and P_V_J are recalculated, the calculation rules are the same as above, and Tp=5 ms. Initial P_V_J=21 us, and is adjusted according to the rules. Finally, P_V_J=21*6=126 us, and continue to match. Tc values between 4.874 ms and 5.126 ms are all successfully matched. Tc4, Tc5, Tc6, Tc7 and Tc8 are successfully matched, the matching result of the service time interval meets the periodicity condition, and the service data is periodic service data. The message feature, the periodicity value and the jitter value are extracted and reported to the management system, and the activation state of the periodicity judgment parameters is terminated, so as not to occupy the processing capacity of the chip.

Figure 9:
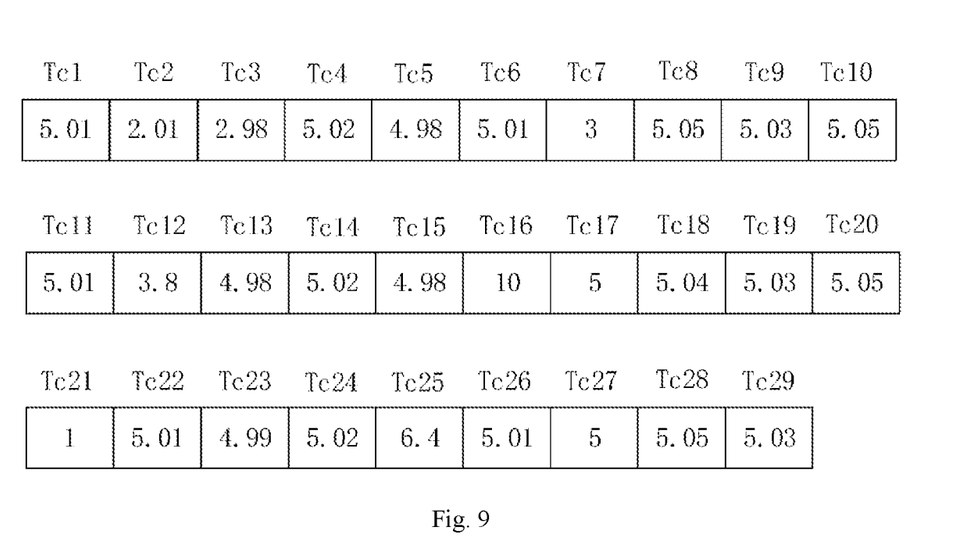
FIG. 9 is a schematic diagram of another service time interval provided in an embodiment of the present application.

In Example three, if the data extraction rule includes DMAC, SMAC, source IP address, destination IP address, and the message length is 80, the set period value in the periodicity judgment parameters Tp=5 ms, the set jitter value P_V_J=100 us, the maximum number of matching time intervals P_V_Max=29, the minimum number of matching time intervals P_V_Min=5, the maximum number of periodic services is 30, and the minimum number of periodic services is 6. 30 pieces of service data are acquired, and 29 service time intervals are determined, as shown in FIG. 9, which is a schematic diagram of another service time interval provided in an embodiment of the present application, and the unit of service time interval in FIG. 9 is milliseconds. Since the set period value and the set jitter value are fixed values, Tp=5 ms, and P_V_J=100 us, each service time interval is matched sequentially, and the service time interval is denoted by Tc. When Tc is between 4.9 ms and 5.1 ms, the matching is successful, otherwise, the matching fails. Two parameters, ConCnt and MoveCnt, are set. The initial values of ConCnt and MoveCnt are both 0. ConCnt indicates the number of service time intervals successfully matched, and MoveCnt indicates the number of initial values moved back due to matching failure.

The subsequent processing flow is as shown in Example one, until MoveCnt=23, that is, the number of unmatched service time intervals is less than 5. Because the number of service time intervals successfully matched in succession is less than five, a determination is made that the matching result of the current service time interval does not meet the periodicity condition, and the service data is not periodic service data, the data is not reported, and the activation state of the periodicity judgment parameters is terminated.

According to the embodiments of the present application, a service time interval between service data is determined; a matching result of the service time interval is determined according to a set period value and a set jitter value in a preset periodicity judgment parameter; and a determination is made that the service data is periodic service data if a determination is made that the matching result of the current service time interval meets a periodicity condition according to a minimum number of matching time intervals and a maximum number of matching time intervals in the periodicity judgment parameters. According to the technical scheme provided in the embodiment of the present application, a service data detection mode is added to the network, which can implement the identification of periodic service data, so as to facilitate the configuration of service features, resources and the like for the periodic service data. Compared with the manual configuration in the existing technology, the service data detection mode can achieve the effects of reducing errors and omissions and configuration workload, and accelerate the deployment of deterministic services.

Figure 10:
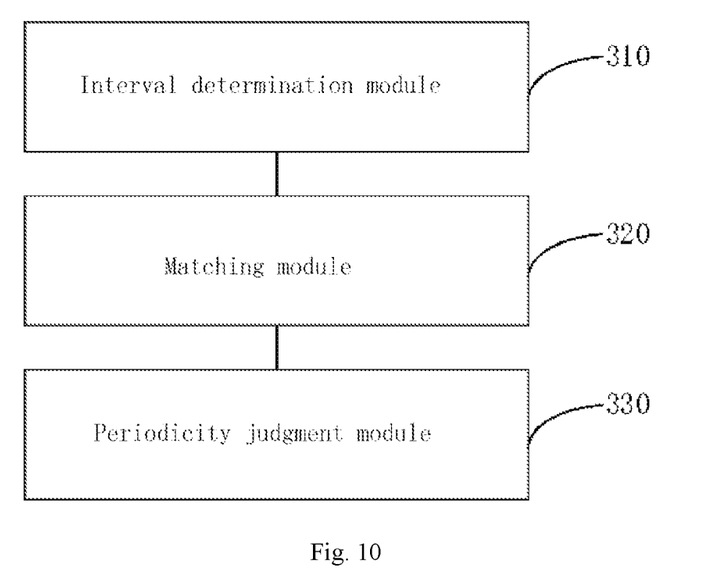
FIG. 10 is a schematic structural diagram of a service detection apparatus provided in an embodiment of the present application.

FIG. 10 is a schematic structural diagram of a service detection apparatus provided in an embodiment of the present application, and this embodiment may be applicable to the case of implementing detection of periodic service data. The service detection apparatus provided in the embodiment of the present application can perform the service detection method provided in any embodiment of the present application, and has the corresponding functional modules and beneficial effects of the performed method. The apparatus includes:

an interval determination module 310, configured to determine a service time interval between service data;
a matching module 320, configured to determine a matching result of the service time interval according to a set period value and a set jitter value in a preset periodicity judgment parameter; and
a periodicity judgment module 330, configured to determine that the service data is periodic service data if a determination is made that the matching result of the current service time interval meets a periodicity condition according to a minimum number of matching time intervals and a maximum number of matching time intervals in the periodicity judgment parameter.

According to the embodiments of the present application, a service time interval between service data is determined; a matching result of the service time interval is determined according to a set period value and a set jitter value in a preset periodicity judgment parameter; and a determination is made that the service data is periodic service data if a determination is made that the matching result of the current service time interval meets a periodicity condition according to a minimum number of matching time intervals and a maximum number of matching time intervals in the periodicity judgment parameters. According to the technical scheme provided in the embodiment of the present application, a service data detection mode is added to the network, which can implement the identification of periodic service data, so as to facilitate the configuration of service features, resources and the like for the periodic service data. Compared with the manual configuration in the existing technology, the service data detection mode can achieve the effects of reducing errors and omissions and configuration workload, and accelerate the deployment of deterministic services.

Further, the interval determination module 310 is configured to:
determine the service time interval according to a time stamp of the service data.

Further, the matching module 320 is configured to:
determine that matching is successful if a difference between the service time interval and the set period value is less than or equal to the set jitter value; otherwise, determine that the matching fails; where the set jitter value and the set period value are fixed values or estimated values.

Further, the periodicity judgment module 330 is configured to:
determine that the matching result of the current service time interval meets the periodicity condition if the number of service time intervals successfully matched in succession for a first time is the minimum number of matching time intervals, and the number of currently matched service time intervals is less than or equal to the maximum number of matching time intervals.

Further, the apparatus further includes:
an aperiodic judgment module, configured to determine that the matching result of the current service time interval does not meet the periodicity condition, and the service data is aperiodic data, if the number of currently matched service time intervals is equal to the maximum number of matching time intervals, and the number of service time intervals successfully matched in succession is less than the minimum number of matching time intervals.

Further, the apparatus further includes:
a data acquisition module, configured to acquire, before the determining a service time interval between service data, the service data according to a preset data extraction rule, where the data extraction rule includes at least one of message length, source MAC address, destination MAC address, virtual local area network, priority, source IP address, destination IP address, port number or application layer protocol, and forms of the message length includes a length range, a discrete form, and a mixed form.

Further, the apparatus further includes:
a data reporting module, configured to report the service data for service configuration after determining that the service data is periodic service data.

The service detection apparatus provided in the embodiment of the present application can perform the service detection method provided in any embodiment of the present application, and has the corresponding functional modules and beneficial effects of the performed method.

Figure 11:
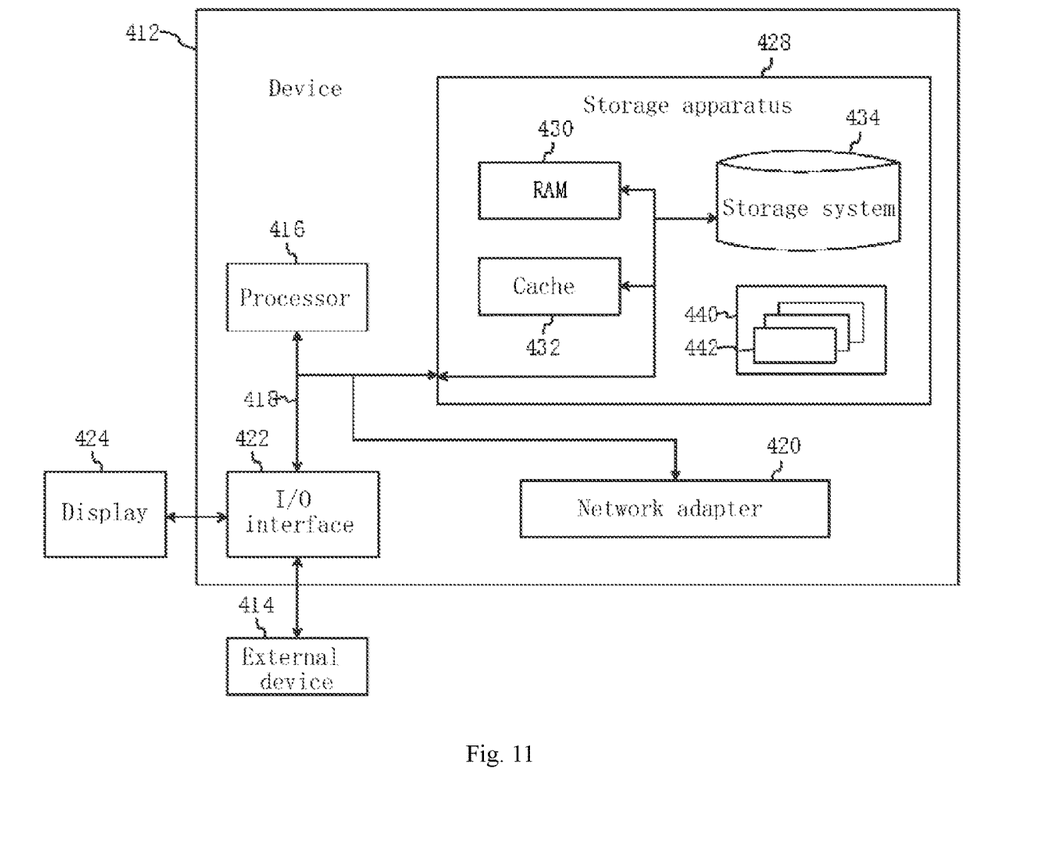
FIG. 11 is a schematic structural diagram of a device provided in an embodiment of the present application.

FIG. 11 is a schematic structural diagram of a device provided in an embodiment of the present application. FIG. 11 shows a block diagram of an example device 412 suitable for implementing embodiments of the present application. The device 412 shown in FIG. 11 is only an example, and should not constitute any limitation on the function and application scope of the embodiments of the present application.

As shown in FIG. 11, the device 412 is in the form of a general-purpose device. Components of the device 412 may include, but are not limited to, one or more processors 416, a storage apparatus 428, and a bus 418 connecting different system components, including the storage apparatus 428 and the processor 416.

The bus 418 may be one or more of several types of bus structures, including a storage apparatus bus or a storage apparatus controller, a peripheral bus, a graphics acceleration port, a processor, or a local bus using any of a variety of bus structures. For example, these architectures include, but are not limited to, industry subversive alliance (ISA) bus, micro channel architecture (MAC) bus, enhanced ISA bus, video electronics standards association (VESA) local bus and peripheral component interconnect (PCI) bus.

The device 412 typically includes a variety of computer system readable media. These media may be any available media that is accessable by the device 412, including volatile and nonvolatile media, removable and non-removable media.

The storage apparatus 428 may include a computer system readable medium in the form of volatile memory, such as a random access memory (RAM) 430 and/or a cache memory 432. The device 412 may further include other removable/non-removable, volatile/nonvolatile computer system storage media. By way of example only, the storage system 434 may be used for reading and writing non-removable and nonvolatile magnetic media (not shown in FIG. 11, commonly referred to as "hard disk drive"). Although not shown in FIG. 11, a disk drive for reading and writing a removable nonvolatile disk (such as floppy disk) and an optical disk drive for reading and writing a removable nonvolatile disk (such as compact disc read-only memory (CD-ROM), digital video disc read-only memory (DVD-ROM) or other optical media) may be provided. In these cases, each drive may be connected to the bus 418 through one or more data media interfaces. The storage apparatus 428 may include at least one program product having a set (e.g., at least one) of program modules configured to perform the functions of various embodiments of the present application.

A program/utility 440 having a set (at least one) of program modules 442 may be stored, for example, in the storage apparatus 428. Such program modules 442 include, but are not limited to, an operating system, one or more application programs, other program modules, and program data. Each or some combination of these examples may include the implementation of a network environment. The program modules 442 generally perform the functions and/or methods in the embodiments described in the present application.

The device 412 may also communicate with one or more external devices 414 (e.g., a keyboard, a pointing terminal, a display 424 and the like), and may communicate with one or more terminals that enable a user to interact with the device 412, and/or may communicate with any terminal that enables the device 412 to communicate with one or more other computing terminals (e.g., a network card, a modem and the like). Such communication may be performed through an input/output (I/O) interface 422. Further, the device 412 may communicate with one or more networks (e.g., a local area network (LAN), a wide area network (WAN), and/or a public network such as the Internet) through a network adapter 420. As shown in FIG. 11, the network adapter 420 communicates with other modules of the device 412 through the bus 418. It should be understood that, although not shown in the figure, other hardware and/or software modules may be used in conjunction with the device 412, the hardware and/or software modules includes, but are not limited to, a microcode, a terminal driver, a redundant processor, an external disk drive array, a redundant arrays of independent disks (RAID) system, a tape drive, a data backup storage system and the like.

The processor 416 executes various functional applications and data processing by running the program stored in the storage apparatus 428, to implement, for example, the service detection method provided in the embodiments of the present application. The method includes:

determining a service time interval between service data;
determining a matching result of the service time interval according to a set period value and a set jitter value in a preset periodicity judgment parameter; and
determining that the service data is periodic service data if a determination is made that the matching result of the current service time interval meets a periodicity condition according to a minimum number of matching time intervals and a maximum number of matching time intervals in the periodicity judgment parameter.

An embodiment of the present application further provides a non-transitory computer-readable storage medium storing a computer program. The program, when executed by a processor, implements the service detection method provided in the embodiments of the present application. The method includes:

determining a service time interval between service data;
determining a matching result of the service time interval according to a set period value and a set jitter value in a preset periodicity judgment parameter; and
determining that the service data is periodic service data if a determination is made that the matching result of the current service time interval meets a periodicity condition according to a minimum number of matching time intervals and a maximum number of matching time intervals in the periodicity judgment parameter.

The non-transitory computer-readable storage medium of the embodiments of the present application may adopt any combination of one or more computer-readable media. The computer-readable medium may be a computer-readable signal medium or a computer-readable storage medium. The computer-readable storage medium may be, for example, but not limited to, an electronic, magnetic, optical, electromagnetic, infrared, or semiconductor system, apparatus or device, or a combination of any of the forgoing. More specific examples (a non-exhaustive list) of computer-readable storage media include: an electrical connection having one or more wires, a portable computer diskette, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the foregoing. In this document, the computer-readable storage medium may be any tangible medium that contains or stores a program that may be used by or in combination with an instruction execution system, an apparatus or a device.

A computer-readable signal medium may include a propagated data signal with a computer readable program code embodied therein, for example, in baseband or as part of a carrier wave. Such propagated data signals may take a variety of forms including, but not limited to, electromagnetic signals, optical signals, or any suitable combination of the foregoing. The computer-readable signal medium may also be any computer-readable medium other than a computer-readable storage medium that may send, propagate, or transport the program for use by or in combination with an instruction execution system, an apparatus or a device.

The program code embodied in the computer readable medium may be transmitted using any appropriate medium, including but not limited to wireless, wired, optical fiber cable, radio frequency (RF), and the like, or any suitable combination of the foregoing.

The computer program code for executing the operation of the present application may be written in any combination of one or more programming languages, including an object oriented programming language, such as Java, Smalltalk, C++ or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or terminal. In the scenario where a remote computer is involved, the remote computer may be connected to the user's computer through any type of network, including a local area network (LAN) or a wide area network (WAN), or the connection may be made to an external computer (for example, through the Internet using an Internet Service Provider).

It is noted that the foregoing are only some embodiments of the present application and the applied technical principles. Those having ordinary skill in the art will understand that the present application is not limited to the specific embodiments described herein, and various obvious changes, readjustments and substitutions may be made by those having ordinary skill in the art without departing from the protection scope of the present application. Therefore, although the present application has been described in detail through the above embodiments, the present application is not limited to the above embodiments, but may also include other equivalent embodiments without departing from the concept of the present application, and the scope of the present application is determined by the scope of the appended Claims.

What is claimed is:

1. A service detection method, comprising:
    determining a service time interval between service data;
    determining a matching result of the service time interval according to a set period value and a set jitter value in a preset periodicity judgment parameter; and
    determining that the service data is periodic service data in response to determining that the matching result of the current service time interval meets a periodicity condition according to a minimum number of matching time intervals and a maximum number of matching time intervals in the periodicity judgment parameter;
    wherein the determining a matching result of the service time interval according to a set period value and a set jitter value in a preset periodicity judgment parameter comprises:

determining that matching is successful in response to a difference between the service time interval and the set period value being less than or equal to the set jitter value; determining that the matching fails in response to the difference between the service time interval and the set period value being greater than the set jitter value; wherein the set jitter value and the set period value are estimated values, the estimated values are automatically acquired estimated values.

2. The method of claim 1, wherein the determining a service time interval between service data comprises:
determining the service time interval according to a time stamp of the service data.

3. The method of claim 1, wherein the determining that the matching result of the current service time interval meets a periodicity condition according to a minimum number of matching time intervals and a maximum number of matching time intervals in the periodicity judgment parameter comprises:
determining that the matching result of the current service time interval meets the periodicity condition in response to the number of service time intervals successfully matched in succession for a first time being the minimum number of matching time intervals, and the number of currently matched service time intervals being less than or equal to the maximum number of matching time intervals.

4. The method of claim 1, further comprising:
determining that the matching result of the current service time interval does not meet the periodicity condition, and the service data is aperiodic data, in response to the number of currently matched service time intervals being equal to the maximum number of matching time intervals, and the number of service time intervals successfully matched in succession being less than the minimum number of matching time intervals.

5. The method of claim 1, wherein before the determining a service time interval between service data, the method further comprises:
acquiring the service data according to a preset data extraction rule,
wherein the data extraction rule comprises at least one of message length, source MAC address, destination MAC address, virtual local area network, priority, source IP address, destination IP address, port number or application layer protocol, and
wherein forms of the message length comprises a length range, a discrete form, and a mixed form.

6. The method of claim 1, wherein after the determining that the service data is periodic service data, the method further comprises:
reporting the service data for service configuration.

7. A device, comprising:
one or more processors;
a memory, configured to store one or more programs; the one or more programs, when executed by the one or more processors, cause the one or more processors to carry out a service detection method, comprising:
determining a service time interval between service data;
determining a matching result of the service time interval according to a set period value and a set jitter value in a preset periodicity judgment parameter; and
determining that the service data is periodic service data in response to determining that the matching result of the current service time interval meets a periodicity condition according to a minimum number of matching time intervals and a maximum number of matching time intervals in the periodicity judgment parameter;
wherein the determining a matching result of the service time interval according to a set period value and a set jitter value in a preset periodicity judgment parameter comprises:
determining that matching is successful in response to a difference between the service time interval and the set period value being less than or equal to the set jitter value;
determining that the matching fails in response to the difference between the service time interval and the set period value being greater than the set jitter value; wherein
the set jitter value and the set period value are estimated values, the estimated values are automatically acquired estimated values.

8. A non-transitory computer-readable storage medium storing a computer program which, when executed by a processor, causes the processor to carry out a service detection method, comprising:
determining a service time interval between service data;
determining a matching result of the service time interval according to a set period value and a set jitter value in a preset periodicity judgment parameter; and
determining that the service data is periodic service data in response to determining that the matching result of the current service time interval meets a periodicity condition according to a minimum number of matching time intervals and a maximum number of matching time intervals in the periodicity judgment parameter;
wherein the determining a matching result of the service time interval according to a set period value and a set jitter value in a preset periodicity judgment parameter comprises:
determining that matching is successful in response to a difference between the service time interval and the set period value being less than or equal to the set jitter value; determining that the matching fails in response to the difference between the service time interval and the set period value being greater than the set jitter value;
wherein the set jitter value and the set period value are estimated values, the estimated values are automatically acquired estimated values.

* * * * *